United States Patent
Chang

(10) Patent No.: US 6,932,903 B2
(45) Date of Patent: Aug. 23, 2005

(54) ULTRAVIOLET-AND-OZONE DISINFECTION APPARATUS HAVING IMPROVEMENT ON DISINFECTION EFFECT

(75) Inventor: Steven Shih-Yi Chang, Hsinchu (TW)

(73) Assignee: Senno Technology Inc., Hsinchu (TW)

( * ) Notice: Subject to any disclaimer, the term of this patent is extended or adjusted under 35 U.S.C. 154(b) by 113 days.

(21) Appl. No.: 10/458,259

(22) Filed: Jun. 11, 2003

(65) Prior Publication Data

US 2004/0140269 A1 Jul. 22, 2004

(30) Foreign Application Priority Data

Jan. 22, 2003 (TW) .......................................... 92101427

(51) Int. Cl.⁷ ............................... C02F 1/32; C02F 1/78
(52) U.S. Cl. .................... 210/192; 210/748; 422/186.3; 250/437
(58) Field of Search ................................ 210/192, 748, 210/760; 422/24, 29, 186.07, 186.3; 250/435, 436, 437

(56) References Cited

U.S. PATENT DOCUMENTS

| | | | | |
|---|---|---|---|---|
| 3,519,817 A | * | 7/1970 | Brunner ...................... 250/436 |
| 4,230,571 A | * | 10/1980 | Dadd .......................... 210/760 |
| 4,273,660 A | * | 6/1981 | Beitzel ........................ 210/760 |
| 4,274,970 A | * | 6/1981 | Beitzel ........................ 210/748 |
| 4,676,896 A | * | 6/1987 | Norton ......................... 210/192 |
| 4,798,702 A | * | 1/1989 | Tucker ......................... 422/24 |
| 4,968,437 A | * | 11/1990 | Noll et al. ................... 210/748 |
| 5,230,792 A | * | 7/1993 | Sauska et al. ................. 210/97 |
| 5,540,848 A | * | 7/1996 | Engelhard .................... 210/748 |
| 5,709,799 A | * | 1/1998 | Engelhard .................... 210/748 |
| 5,779,912 A | * | 7/1998 | Gonzalez-Martin et al. 210/748 |
| 6,099,799 A | * | 8/2000 | Anderson ..................... 422/24 |
| 6,547,963 B1 | * | 4/2003 | Tsai ........................... 210/232 |
| 6,685,825 B1 | * | 2/2004 | Chang ......................... 210/87 |
| 6,875,988 B1 | * | 4/2005 | Sauska et al. ......... 250/455.11 |

FOREIGN PATENT DOCUMENTS

JP        04247294 A  *  9/1992

* cited by examiner

*Primary Examiner*—Frank M. Lawrence
(74) *Attorney, Agent, or Firm*—Rabin & Berdo, P.C.

(57) ABSTRACT

An ultraviolet-and-ozone disinfection apparatus 200 providing an improvement on disinfection, includes a disinfection tank 202, a mercury UV lamp 210 enclosed by a quartz tube 208 for generating UV light with air trapped between them undergoing UV irradiation to generate ozone, an ozone transmitting tube 216, a spiral water transmitting tube 215 wrapping around the quartz tube in a spiral manner to achieve sufficient disinfection by mixing ozone in water, a sleeve barrel enclosing the spiral tube. Along the entire flow path, water is exposed to UV radiation to achieve sufficient disinfection and reduce excessive ozone that is harmful to human health.

8 Claims, 7 Drawing Sheets

ULTRAVIOLET-AND-OZONE DISINFECTION APPARATUS HAVING IMPROVEMENT ON DISINFECTION EFFECT

CROSS REFERENCE TO RELEVANT APPLICATION

This application is referred to a previous Taiwan application of serial no. 091133459 filed on Nov. 14, 2002. The applicant is also the inventor for both previous and present application.

FIELD OF THE INVENTION

The invention relates to an ultraviolet-and-ozone disinfection apparatus that improves the disinfection effect, and more particularly, a disinfection apparatus that provides double-spiral water flows that causes ozone gas and water to mix and dissolve thoroughly and homogenously. In addition, the water is exposed thoroughly under the irradiation of ultraviolet (UV) light to enhance the disinfection effect.

BACKGROUND OF THE INVENTION

In the conventional water treatment process, the water to be treated is exposed to the ozone generated by a mercury UV lamp. Another method is to expose an air stream to UV light irradiation causing the oxygen in the air to generate ozone. This ozonated air is then dissolved into the water to be treated for disinfection to purify water.

There are mainly two methods to generate ozone; one method is a high pressure electric discharge and another is irradiation by a mercury UV lamp. Generally, in the method of UV irradiation by a UV lamp, the UV light generated by the lamp contains two wavelengths: 254 nm (nanometer) and 185 nm. Wavelength of about 185 nm is the main wave band to generate ozone for disinfecting water. Once the UV light having a wavelength of about 254 nm contacts a microorganism, the UV light can be absorbed easily by protein, DNA and RNA in the microorganism. After the absorption of UV light by some protein substances reaches certain strength (dose), the cell membrane will be ruptured, causing the cell to die. In addition, even if the UV dose is not high enough to cause immediate death of the cell, a lower dose of irradiation is sufficient to cause the microorganism to lose its breeding ability which makes people sick.

Ozone is basically a very strong oxidizing agent. As indicated above, when the ozone gets in contact with a microorganism, the disinfecting mechanism includes: 1. Direct destruction of the cell wall causing the cell to die due to the outflow of cell composition; 2. Generation of a by-product of free radical due to the decomposition of ozone causing the cell to die; 3. Destruction of the constitutive structure of the nucleic acid; 4. Interruption of the bonding causing the separation of polymer.

Both UV light and ozone have the ability to perform disinfection, however, in terms of application, especially on disinfecting the drinking water, each has its own merits and shortcomings. The configuration of the equipment is also a basis for determining the quality of the actual effect. To enhance the disinfection effect, a so-called dual mode method by using both of ozone and UV light methods can be employed in the disinfection apparatus. In this dual mode method, ozone generated from the UV light irradiation having a short wavelength of around 185 nm is mixed to dissolve in the water to be disinfected. And, UV light having a wavelength of around 254 nm generated by a UV mercury lamp is employed to irradiate water directly.

In the disinfection process design, the ozone generated by a UV lamp is continuously extracted and dissolved into the water for purification, and thereby carrying out the first step of disinfection. The ozonated water is then guided to the exterior of the UV lamp that generated the original ozone. The UV light having a wavelength of 254 nm is then used to irradiate the ozonated water that further enhances the disinfection effect. In the mean time, part of the ozone is reduced which not only makes the water finally flowing out of the apparatus thoroughly be disinfected but also make the excessive and residual ozone be eliminated to prevent human health from being impaired.

In the prior art, the relevant patents have resolved the system design problems such as the generation of ozone and its injection into the water, as well as combining the disinfection of UV radiation. However, they fail to demonstrate their performance of effectively prolonging the irradiation time of UV light and the functioning time of ozone, as well as enhancing the basic requirement of disinfection by mixing and dissolving the ozone in the water homogeneously.

The disinfecting effect of ultraviolet-and-ozone essentially depends on the amount of dosage and the duration of contact time. The UV disinfection usually considers what is known as an UV dose problem. An UV dose refers to an UV fluence rate multiplied by its irradiation time. To achieve a certain disinfection capability, the UV light must have sufficient disinfection strength and a long enough irradiation response time. In general, the irradiation strength of any commercially available UV lamps can all meet the requirement in the initial stage of usage by irradiating the water through a quartz tube to achieve the disinfection effect. The effective reaction time depends on the length of the reaction chamber disregarding whether the UV lamp operates for 24 hours a day or is controlled by means of an on/off switch. A typical commercial product has a contact length of about 30 cm.

Although the description of some prior arts indicates the employment of the natural spiral effect by making use of the impact of water back-flow to extend the irradiation time, the effect of that extension is just within 1.5 times, which is equivalent to around 40 cm of contact length.

Similar to the UV-light disinfection, the evaluation of the disinfection effect of ozone employs the so-called CT value that is a product of the concentration C and the contact time T. Consequently, in order to produce an effective disinfection, sufficient contacting time is necessary to have the ozone mix with and dissolve in the water.

In terms of water treatment, relevant patents as illustrated in FIG. 1 are U.S. Pat. No. 5,266,215 of Engelhard's (Water purification unit) and U.S. Pat. No. 5,540,848 of Engelhard's (Filter retainer for water purification unit). In both cases, the water to be treated is created a vortex pattern 402 surrounding the UV radiation source 401 to eliminate bacteria in the water and microorganisms that are harmful to human health.

Again as shown in FIG. 2 U.S. Pat. No. 6,245,229B1, Kool et al.'s (point-of-use water treatment system) also uses water to be treated to create a vortex pattern 412 surrounding the UV radiation source (not shown in diagram) to eliminate bacteria in water and also microorganisms that are harmful to human health. However, these patents are all simple designs of a spiral water column, and the exposure time to UV radiation is very limited.

Again, as shown in FIG. 3 of U.S. Pat. No. 4,273,660, Beitzel's (purification of water through the use of ozone and ultraviolet light) traditionally soaks the water to be treated 432 directly around the UV lamp tube 431. This patent does not have any spiral design of water flow, so the disinfection effect is also very limited.

In addition, as shown in FIG. 4 of U.S. Pat. Ser. No. 5,707,594, Austin's (Pathogen control system) uses a spiral Teflon (polytetrafluoroethylene) transmitting tube 424 that wraps around the UV Lamp 421 to transmit water. The spiral Teflon tube itself causes the UV irradiation to attenuate, and is therefore unable to achieve the disinfection objective. Furthermore, the Teflon tube is lengthy and expensive, therefore is not economical.

Consequently, how to extend the water flow of water treatment so that the mixture of ozone and water can be well mixed to enhance the disinfection effect, and how to ensure this ozonated water is sufficiently irradiated to enhance the ultraviolet disinfection effect have become the objects of this claim.

SUMMARY OF THE INVENTION

In light of the disadvantages of the prior arts, the invention provides a ultraviolet-and-ozone disinfection apparatus that aims to ameliorate at least some of the disadvantages of the prior art or to provide a useful alternative.

The invention provides an improvement to prolong the time of exposure to the UV irradiation so as to achieve sufficient disinfection effect.

In general, the concentration of ozone generated from the UV lamp is not that high and is less than around one-twentieth comparing with that of the so-called Corona discharge. In view of this, the only way to achieve improvement is to extend the contact time. In accordance to the invention, after mixing the ozone with water, the ozonated water spirals down the tube and the travel distance exceeds 120 cm. The time is prolonged to about 3 to 4 times that of the previous technique. After the ozonated water flows out of the tube in a spiral manner, it flows back upstream (water flows in a double spiral path) to a pitch of a spiral tube and the gap between the tube and the sleeve barrel. All along the flow path, the ozonated water is again under sufficient UV irradiation for disinfection.

To sum up, the invention applies the dual mode disinfection process with the double-spiral-water-flow design to achieve the disinfection result that previous techniques have failed to achieve by effectively extending the ozone and the UV disinfection times.

In view of the imperfection of the prior art, this invention suggests prolonging and improving the contact exposure time to achieve sufficient disinfection effect. So the object of this invention is to provide a dual mode disinfection apparatus and a special double spiral water flow design. The total distance of the flow can go above 120 cm, which is equal to 4 times the irradiation time and this greatly improves the disinfection effect.

It is therefore the main objective of the invention to provide a dual mode of disinfection apparatus and a special double spiral water flow design. That the route of the flow can be as high as 120 cm that is equivalent to 4 times the irradiation time greatly improves the disinfection effect.

To achieve the aforementioned objective, an embodiment of the invention provides a ultraviolet-and-ozone disinfection apparatus that includes a disinfection tank used as a housing and is having an water inlet and an water outlet, a mercury ultraviolet (UV) lamp for generating ultraviolet light, a quartz tube 208 enclosing the mercury UV lamp having air trapped between them being irradiated by the UV light to generate ozone gas, an ozone gas transmitting tube 216 inserted between them, a spiral water transmitting tube 215 surrounding the quartz tube 208 for homogenously mixing the ozone gas in the water to achieve sufficient disinfection effect, as well as a sleeve barrel 217 enclosing the spiral water transmitting tube 215. Following the impact force downstream through the tube, water out-flown from the spiral water transmitting tube 215 generates a reactive water flow that upstream back and flows along the outer surface of the spiral water transmitting tube 215 and through the space in the pitch of the spiral shape inside the sleeve barrel. Therefore, the water is all the way up exposed under the irradiation of the UV light to accomplish sufficient UV disinfection effect and reduce the excessive ozone that is harmful to human health. Finally, the disinfected water flows out of the water outlet to provide drinking water.

In another embodiments of the invention, one end of the sleeve barrel is closed off at the top of the disinfection tank and another end of the sleeve barrel is closed off at the bottom of the disinfection tank. Therefore, the sleeve barrel itself can replace the disinfection tank which houses the disinfection apparatus and therefore the disinfection tank can be removed.

In still another embodiments of the invention, the water inlet and the water outlet of the disinfection tank can be disposed anywhere in the disinfection tank.

In still another embodiments of the invention, the ultraviolet-and-ozone disinfection apparatus can be a single mode of ultraviolet disinfection apparatus having improvement on UV disinfection effect.

In still another embodiments of the invention, the disinfection tank can be made of material selected from the group consisting of plastic, stainless steel and glass.

In still another embodiments of the invention, the number of the mercury of UV lamps is not limited to one but can be increased based on the actual need.

In still another embodiments of the invention, the spiral water transmitting tube can be made of material selected from the group consisting of plastic and glass.

It is still another embodiments of the invention, the sleeve barrel can be made of material selected from the group consisting of plastic, Teflon, stainless steel, and glass.

It is to be understood that both the foregoing general description and the following detailed description are exemplary, and are intended to provide further explanation of the invention as claimed.

It is to be understood that both the foregoing general description and the following detailed description are exemplary, and are intended to provide further explanation of the invention as claimed.

DESCRIPTION OF THE PREFERRED EMBODIMENTS

Figure 1:
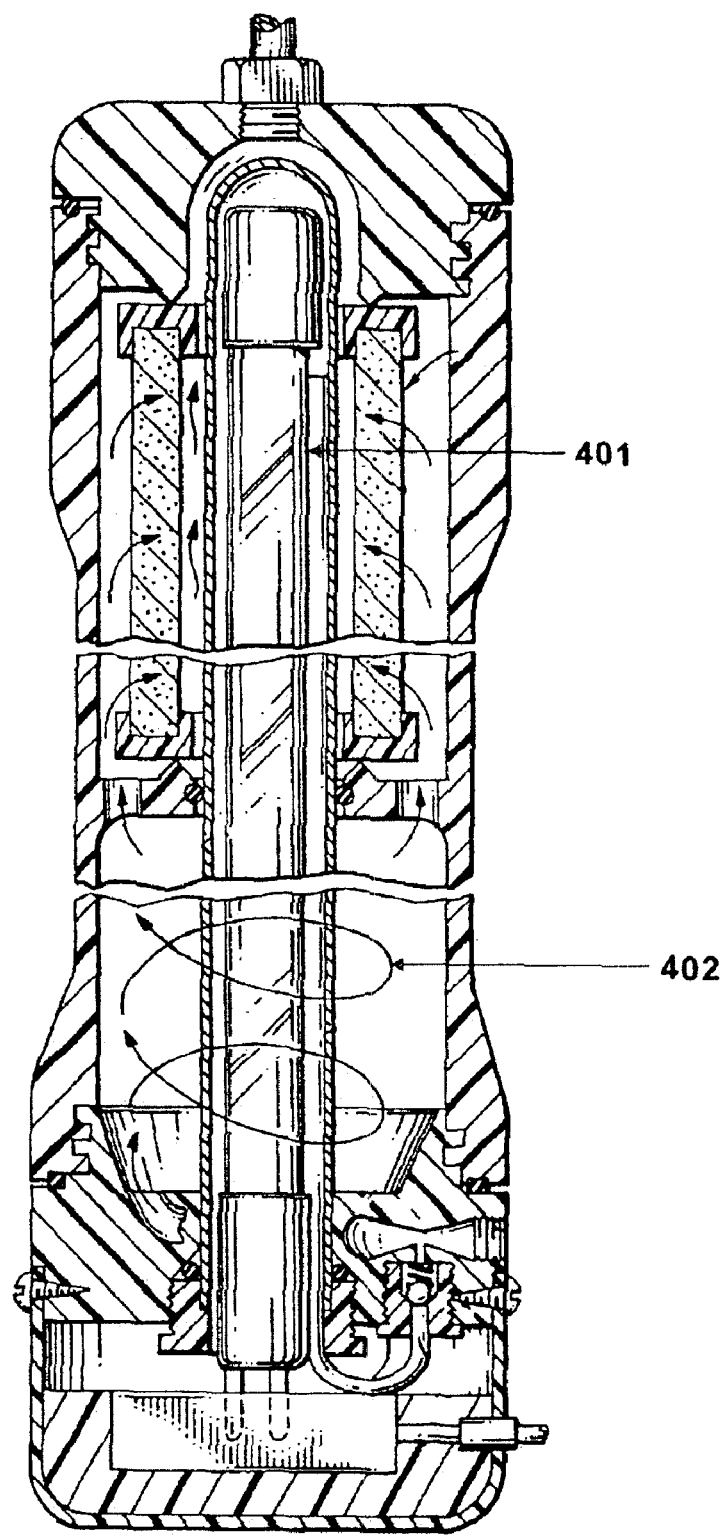
FIG. 1 is a fragmentary section view of a schematic diagram of the water treatment system of the prior art of U.S. Pat. No. 5,266,215.
Figure 2:
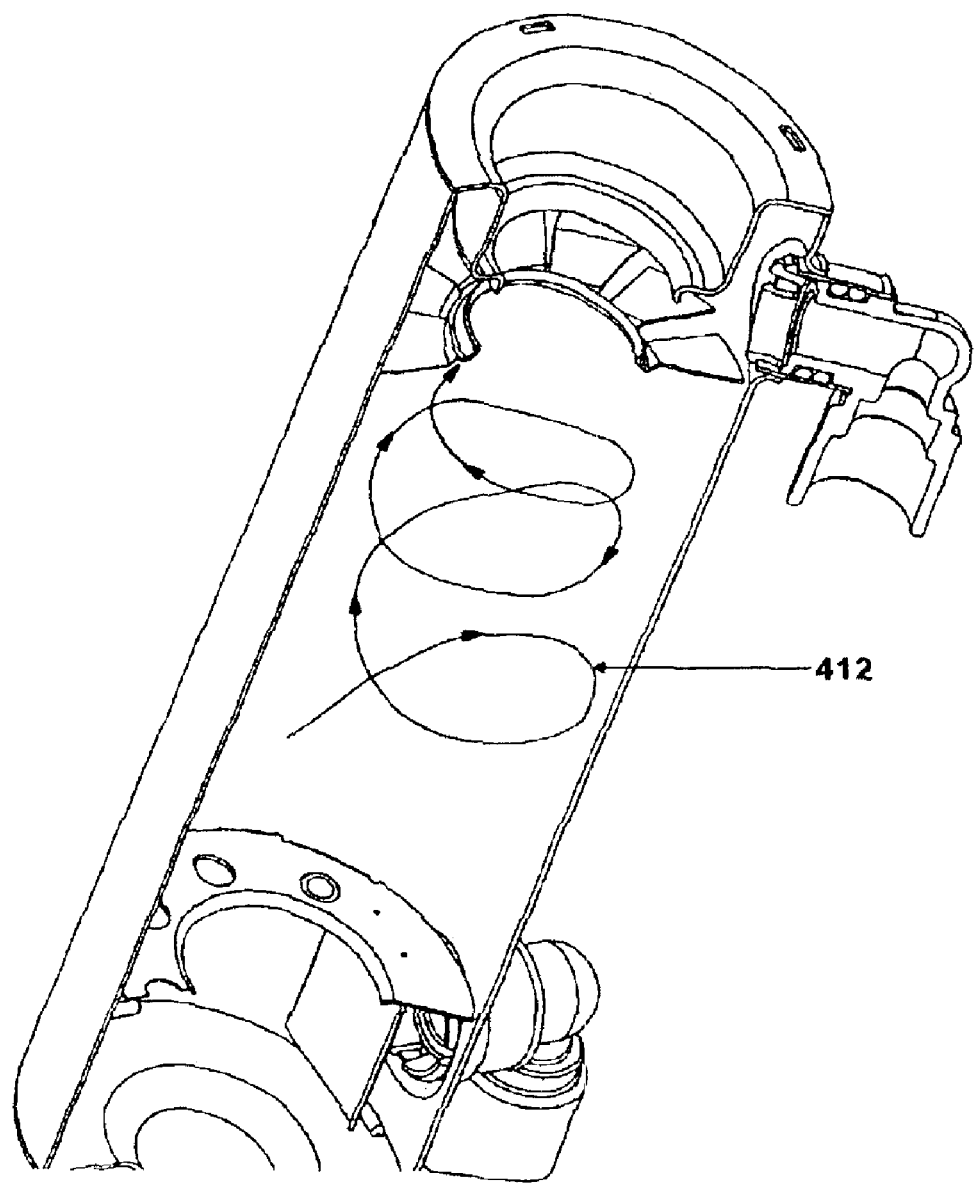
FIG. 2 is a fragmentary section view of a isometric schematic diagram of the water treatment system of the prior art of U.S. Pat. No. 6,245,229.
Figure 3:
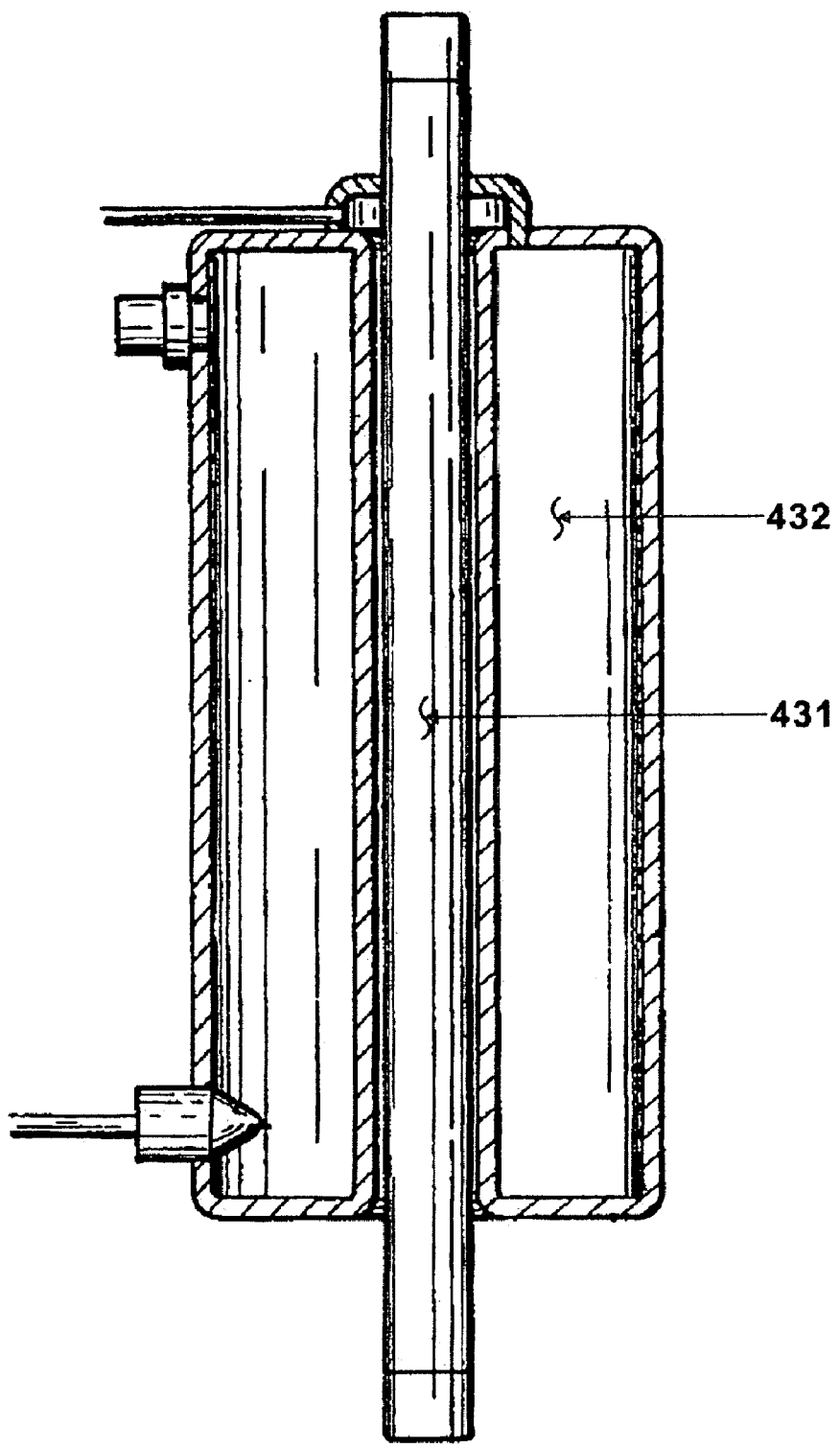
FIG. 3 is fragmentary section view of a schematic diagram of the water treatment system of the prior art of U.S. Pat. No. 4,273,660.
Figure 4:
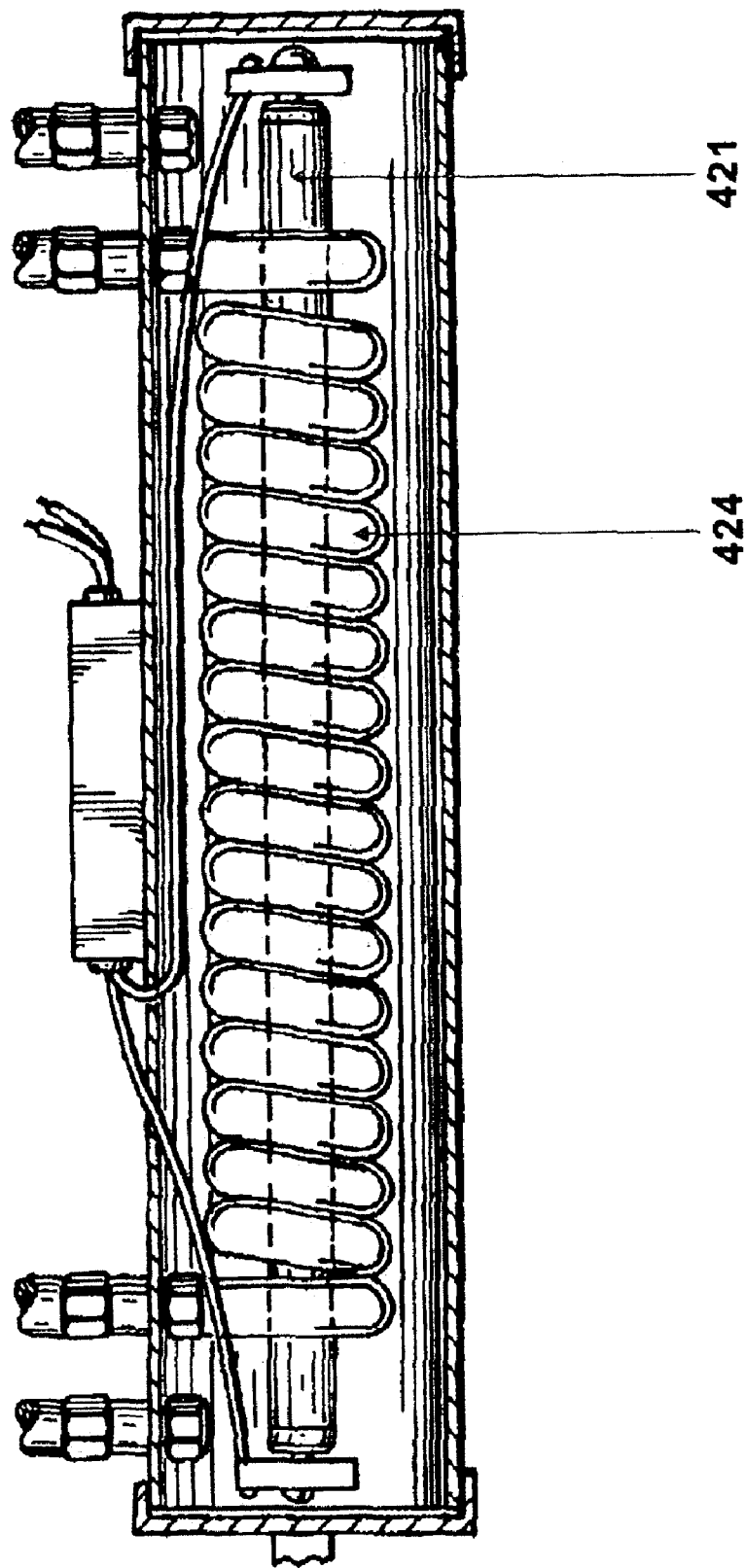
FIG. 4 is fragmentary section view of a schematic diagram of the water treatment system of the prior art of U.S. Pat. No. 5,707,594.
Figure 5:
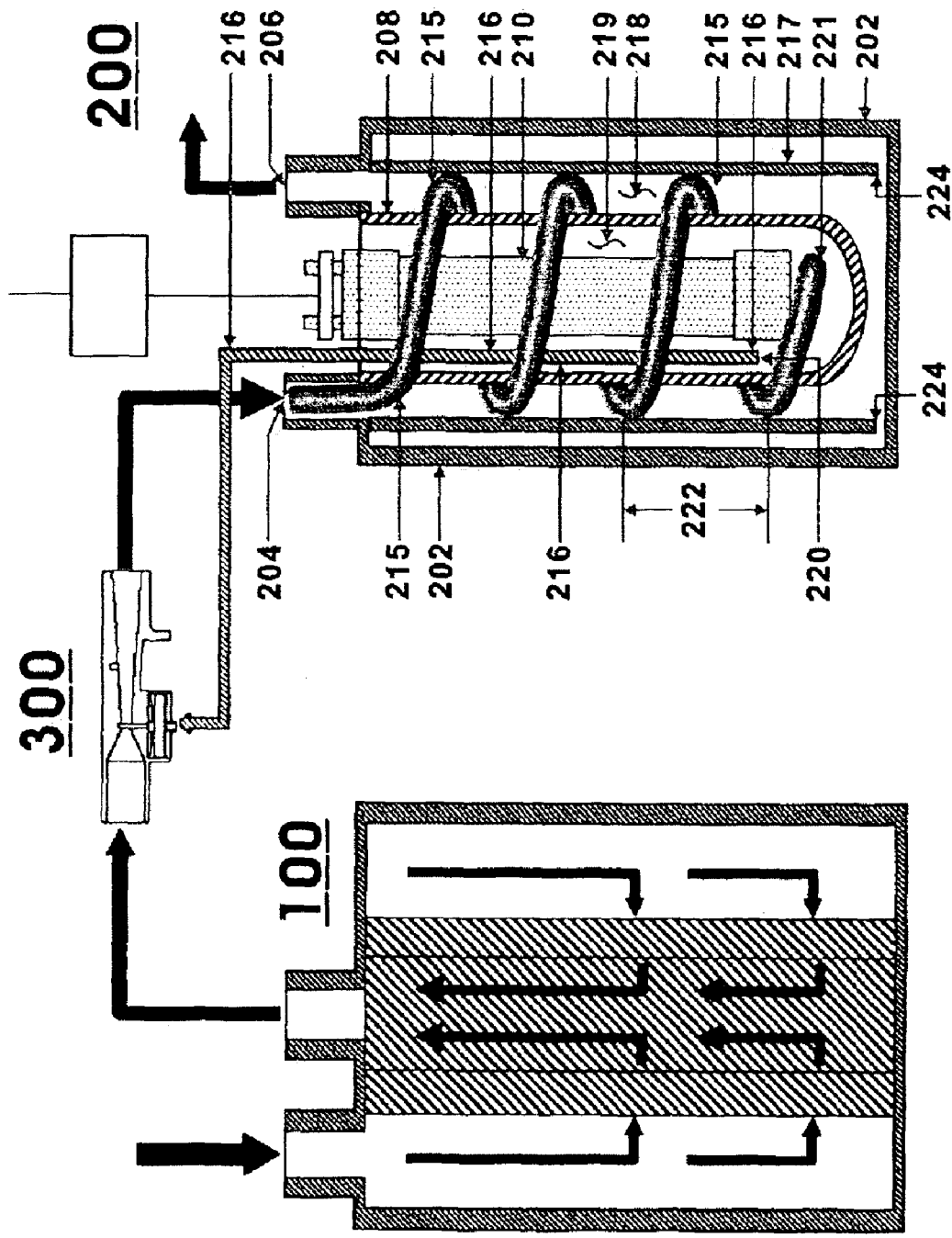
FIG. 5 is a section view of a schematic diagram of the water treatment system relevant to the invention.

As shown in FIG. 5, the ultraviolet-and-ozone disinfection apparatus 200 of the invention that provides an improvement on disinfection effect is a part of a water treatment system. The water treatment system includes a filtering apparatus 100, a disinfection apparatus 200, and an ozone injection apparatus 300.

The ultraviolet-and-ozone disinfection apparatus 200 includes a disinfection tank 202, a mercury UV lamp 210, a quartz tube 208, an ozone transmitting tube 216, a spiral water transmitting tube 215, and a sleeve barrel 217.

Figure 6:
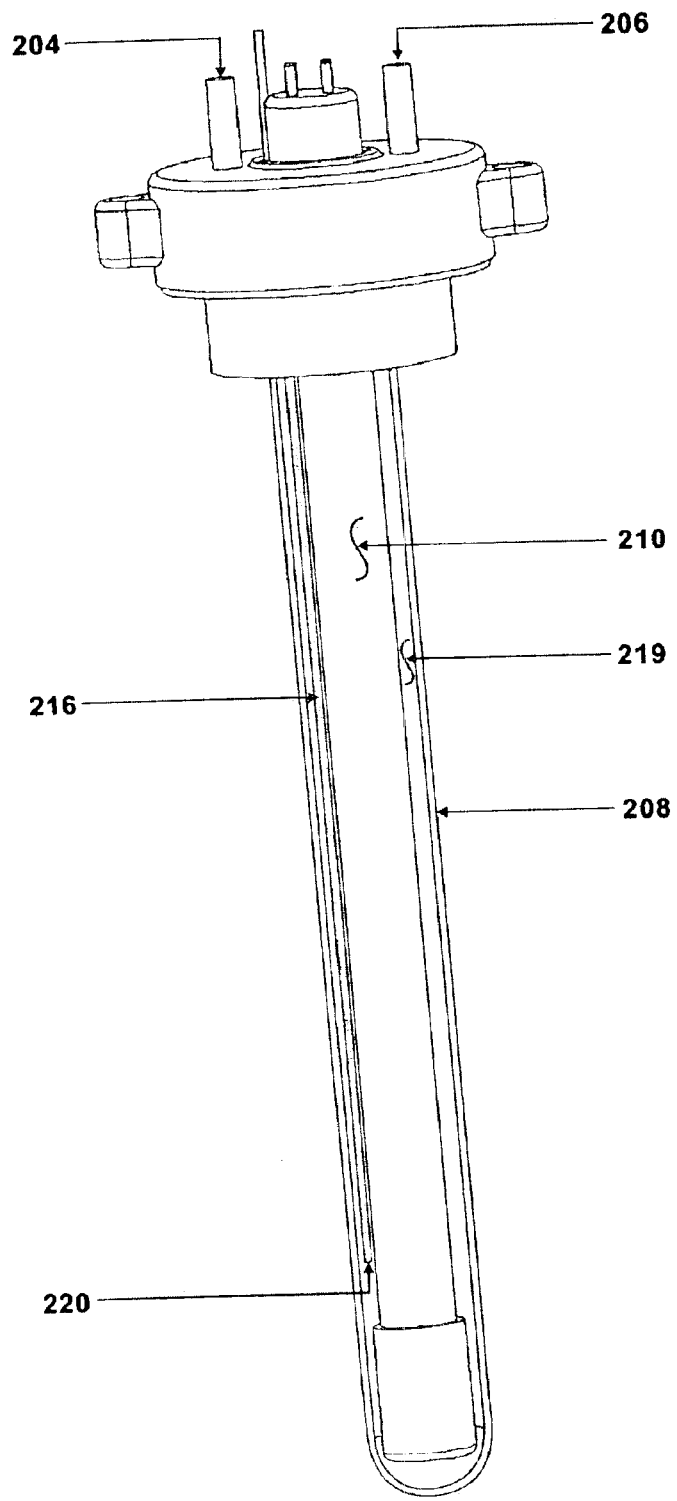
FIG. 6 is fragmentary section view of a schematic diagram of the disinfection apparatus of the invention.
Figure 7:
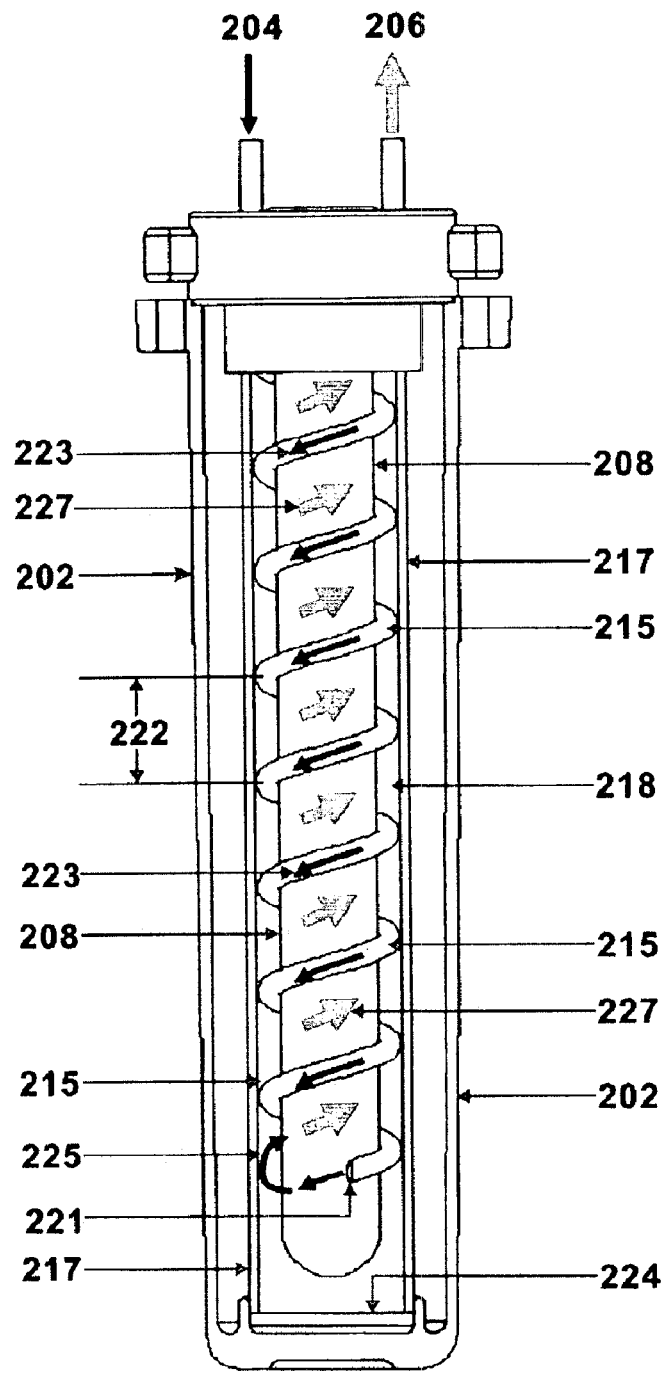
FIG. 7 is a fragmentary section view of a schematic diagram of the disinfection apparatus of the invention using two different arrows to represent the direction of water flow created by a spiral water flow.

As shown in FIGS. 5 and 7, the disinfection tank 202 is used as housing for the disinfection apparatus 200 and has a water inlet 204 and a water outlet 206. The mercury UV lamp 210 (FIG. 6) centered in the disinfection apparatus 200 is used to generate UV light after an electrical charge is applied. A wavelength of about 185 nm of the UV light can make the air generate ozone while a wavelength of about 254 nm of the UV light can be used for water disinfection, and also can eliminate excessive ozone. In other applications, the water inlet and the water outlet can be placed anywhere in the disinfection tube. Moreover, the number of mercury UV lamps does not have to be limited to one and can be increased if needed. The disinfection tube 202 can be made of material such as plastic, stainless steel or glass.

FIGS. 5, 6, and 7 show a translucent quartz tube 208 which can be penetrated by UV light with the wavelength of about 254 nm but not by UV light with the wavelength of about 185 nm. The UV lamp 210 is enclosed by the quartz tube 208 with a gap 219 between them, and the gap is filled with air. The quantity of ozone generated by the UV irradiation with the wavelength of about 185 nm is more than the quantity of ozone eliminated by UV irradiation with a wavelength of about 254 nm. Therefore, the net quantity of ozone will be increased due to the UV irradiation.

As shown in FIGS. 5 and 6, the ozone gas transmitting tube 216 is inserted into the gap 219 between the mercury UV lamp 210 and the quartz tube 208. One end of the ozone gas transmitting tube 216 is connected to the ozone injection apparatus 300, while the other end is exposed to an air inlet 220 inside the gap 218. Ozone is generated under UV light Irradiation to the air in the gap 219 and is drawn by the suction force of the ozone injection apparatus 300 that created a low pressure. Since the ozone transmitting tube 216 is a non-transparent tube and cannot be penetrated by UV light, therefore. Although the ozone is exposed to UV light irradiation, the concentration of ozone in the ozone transmitting tube 216 is not affected.

Furthermore, as shown in FIGS. 5 and 7 the spiral water transmitting tube 215 is wrapped around the quartz tube 208 having one end of which connected to the water inlet 204, while the other end connected to a flood gate 221. The ozonated water transmitted from the ozone injection apparatus 300 through the water inlet 204 is well mixed, and sufficient disinfection effect can be achieved. But because UV light cannot penetrate through the non-transparent spiral water transmitting tube 215, the UV light does not affect the ozonated water inside the spiral water transmitting tube 215 for ozone disinfection. The spiral water transmitting tube 215 can be made of plastic or glass material. Besides, excessive thick wall of the water transmitting tube 215 may attenuate the strength of the UV light that may result in making the disinfection become less effective. This kind of disadvantage can be improved since the water is restricted within the water transmitting tube 215 that is as thin as about 6 mm thick.

Again, as shown in FIGS. 5 and 7, the sleeve barrel 217 is slipped around the peripheral of the spiral water transmitting tube. One end of the sleeve barrel is closed off and is at the top end of a disinfection tank 202. Another end of the sleeve barrel is facing the opening 224 at the bottom of the disinfection tank 202. Water flows out from the flood gate 221 of the spiral water transmitting tube 215 and downstream following the small black arrow direction 223. This generates a return flow at the bottom of the disinfection tank 202 with an impact along the small black arrow direction 225. The water flows back upstream following the gray arrow direction 227 along the exterior of the spiral transmitting tube 215 wrapping around the quartz tube 208 and through the gap 222 in the pitch of the helix. Along the flow path, water is exposed to the UV light with a wavelength of about 254 nm generated by the mercury UV lamp 210 (FIGS. 5 and 6) that penetrates through the quartz tube 208 achieving sufficient UV disinfection. Meanwhile, the UV light reduces excessive ozone that is harmful to human health. Finally, water is guided to flow out from the disinfection tank 202 through the water outlet 206, and is ready for drinking water. The sleeve barrel 217 can be made of plastic, Teflon, stainless steel or glass. The route of the design of the double-spiral water flow is more than 120 cm. which allows 4 times the irradiation time and greatly improves the disinfection effect.

Another embodiment of the invention is that one end of the sleeve barrel 217 is closed off at the top end of the disinfection tank 202 while the other end is closed off at the bottom end of the disinfection tank 202. Therefore, the disinfection tank 202 used as housing for the disinfection apparatus 200 can be replaced by the sleeve barrel 217 itself thereby eliminating the disinfection tank 202.

The aforementioned disinfection apparatus is a dual mode of ultraviolet-and-ozone disinfection apparatus but other applications have disinfection apparatus with only a single mode of an ultraviolet disinfection.

EFFECT OF THE INVENTON

1. The combination of ultraviolet-and-ozone disinfection functions as a dual mode disinfection apparatus. The water flow route is lengthened by means of a spiral design. The lengthening of the flow route means that the contact time of water flow under UV irradiation is extended. In addition, the ozone-dissolving rate is increased and thereby the disinfection effect is enhanced as a whole.

2. After water flows through the spiral tube, the water flows back upstream to the water outlet from the pitch of the spiral tube as well as the surrounding inner layer of the sleeve barrel and the spiral tube. When the difference in diameter between the inside (quartz tube) and outside (sleeve barrel) is limited as in the design, the flow of water is restricted. Consequently, the attenuation in the UV irradiation intensity becomes insignificant and the disinfection is more effective.

3. The spiral design of the tube causes the water to swirl and stir continuously inside the tube; therefore the ozone and water are well mixed.

4. The system can be a see-through design using glass material for the sleeve barrel. User can clearly observe the internal process of water treatment thereby achieving objective of a see-through water treatment.
5. The functions of ultraviolet-and-ozone disinfection effect can be separated. The ozone can disinfect while being transmitted in the transmitting tube. Water can be exposed to UV disinfection again when water flows back upstream in the water transmitting tube.

It will become apparent to those people skilled in the art that various modifications and variations can be made to the structure of the invention without departing from the scope or spirit of the invention. In view of the foregoing, it is intended that all the modifications and variation fall within the scope of the following appended claims and their equivalents.

What is claimed is:

1. A dual mode, ultraviolet-and-ozone disinfection apparatus having an improved disinfection effect, which is a part of a water treatment system, the water treatment system being composed of a filter apparatus, the disinfection apparatus, and an ozone suction apparatus, the disinfection apparatus comprising:
   a disinfection tank having a water inlet and a water outlet; and
   a disinfection apparatus structure housed in the disinfection tank, including
      a mercury ultraviolet lamp, which is centered in the disinfection tank and is used to generate UV light after switching on, the UV light including
         UV light having a wavelength of about 185 nm for generating ozone in the air, and
         UV light having a wavelength of about 254 nm for disinfecting the water and destroying excessive ozone;
      a semi-transparent quartz tube that is penetrable by the UV light with wavelength of 254 nm and blocks the UV light with wavelength of 185 nm, the mercury UV lamp being enclosed in the quartz tube with a gap therebetween filled with air, the quantity of ozone generated by the UV irradiation with the wavelength of about 185 nm being more than the quantity of ozone destroyed by the UV irradiation having a wavelength of about 254 nm;
      a non-transparent ozone transmitting tube impenetrable by the UV light, with an air inlet inserted in the gap between the mercury UV lamp and the quartz tube, the air in the gap generating ozone through the irradiation by UV light, the ozone being drawn into the ozone suction apparatus through the ozone transmitting tube;
      a translucent UV light impenetrable spiral water transmitting tube, enclosing the quartz tube in a spiral manner with one end of the tube connected to the water inlet while the other end is connected to the water outlet, so that the ozonated water transmitted through the water inlet from the ozone suction apparatus mixes homogeneously, and
      a sleeve barrel enclosing an exterior part of the spiral water transmitting tube, one end of the sleeve barrel being closed off at the top of the disinfection tank and the other end having an opening facing the bottom of the disinfection tank;
   whereby, water flowing out of the spiral water transmitting tube creates a return flow from the downstream flow impact, the water then flows back to surround the quartz tube along the exterior of the spiral tube and through a gap between the pitch of the spiral shape and the sleeve barrel, and all along the path of the Water around the quartz tube, the water is exposed to UV irradiation having a wavelength of about 254 nm penetrating through the quartz tube, and at last, water that flows out of the disinfection tank is available for drinking water.

2. The ultraviolet-and-ozone disinfection apparatus having an improvement on disinfection effect of claim 1 wherein one end of the sleeve barrel is closed off at the top of the disinfection tank and another end of the sleeve barrel is closed off at the bottom of the disinfection tank.

3. The ultraviolet-and-ozone disinfection apparatus having an improvement disinfection effect of claim 1, wherein the disinfection tank is made of material selected from the group consisting of plastic, stainless steel and glass.

4. The ultraviolet-and-ozone disinfection apparatus having an improvement on disinfection effect of claim 1, where the spiral water transmitting tube is made of material selected from die group consisting of plastic and glass.

5. The ultraviolet-and-ozone disinfection apparatus having an improvement on disinfection effect of claim 1, wherein the sleeve barrel is made of material selected from the group consisting of plastic, polytetrafluoroethylene, stainless steel, and glass.

6. An ultraviolet-and-ozone disinfection apparatus for use in a water treatment system, the water treatment system being composed a filter apparatus, the disinfection apparatus, and an ozone suction apparatus, the disinfection apparatus comprising:
   a disinfectant containment means having a water inlet and a water outlet; and
   a disinfection apparatus structure housed in the containment means, including
      a mercury ultraviolet lamp centered in the disinfection apparatus and used to generate UV light, the UV light including
         UV light having a wavelength of about 185 nm for generating ozone in the air, and
         UV light having a wavelength of about 254 nm for disinfecting and destroying excessive ozone;
      a semi-transparent quartz tube, penetrable by the UV light having a wavelength of about 254 nm and blocking the UV light having the wavelength of about 185 nm, the mercury UV lamp being enclosed in the quartz tube with a gap therebetween filled with air, the quantity of ozone generated by the UV irradiation with the wavelength of about 185 nm being more than the quantity of ozone destroyed by the UV irradiation having the wavelength of about 254 nm;
      a non-transparent ozone transmitting tube impenetrable by the UV light, with an air inlet in the gap between the mercury UV lamp and the quartz tube, the air in the gap generating ozone through the irradiation by UV light, the ozone being drawn into the ozone suction apparatus through the ozone transmitting tube; and
      a translucent UV-light-impenetrable spiral water transmitting tube, enclosing the quartz tube in a spiral manner with one end of the tube connected to the water inlet end with the other end opening toward a bottom end of the quartz tube in communication with the water outlet, so that the ozonated water transmitted through the water inlet from the ozone suction apparatus mixes homogeneously;
   the disinfectant containment means enclosing an exterior part of the spiral water transmitting tube, whereby water flowing out of the spiral water transmitting tube creates a return flow from the down stream flow impact, the water then flows back to surround the quartz tube along the exterior of the spiral tube and through a gap between the pitch of the spiral shape and the containment means, and all along the path of the water around the quartz tube the water is exposed to the UV irradiation having a wavelength of about 254 nm penetrating through the quartz tube, and at last, water that flows out of the disinfection tank is available as drinking water.

7. The ultraviolet-and-ozone disinfection apparatus of claim 6, wherein the containment means is made of material selected from the group consisting of polytetrafluoroethylene, plastic, stainless steel and glass.

8. The ultraviolet-and-ozone disinfection apparatus of claim 6, where the spiral water transmitting tube is made of material selected from the group consisting of plastic and glass.

* * * * *